Patented Oct. 9, 1951

2,571,016

UNITED STATES PATENT OFFICE 2,571,016

PRODUCTION OF DICYCLOHEXYLAMINE

Lester J. Dankert, Midland, and Daniel A. Permoda, Bay City, Mich., assignors to The Dow Chemical Company, Midland, Mich., a corporation of Delaware No Drawing. Application May 16, 1949,
Serial No. 93,628

5 Claims. (Cl. 260—563)

This invention concerns an improved method for the production of dicyclohexylamine from mixtures of phenol and aniline.

It is known that aniline alone may catalytically be hydrogenated, though less readily than other aromatic compounds such as benzene and phenol, and that during the hydrogenation some condensation occurs with formation of dicyclohexylamine together with other products. Adkins et al., J. A. C. S. 53 1402-5 (1931) show that the hydrogenation requires employment of high pressures and teach that it was found impractical to reduce aniline at pressures as low at 30 atmospheres. Carswell et al., Ind. Eng. Chem. 29 1247-51 (1937) teach that fractionation of the mixture obtained by the catalytic hydrogenation under pressure of aniline yields cyclohexylamine, unchanged aniline, and a higher boiling residue containing N-phenyl cyclohexylamine and dicyclohexylamine. Diwoky et al., J. A. C. S. 53 1868-75 (1931) show that the hydrogenation of aniline may be accelerated by the presence of phenol. They hydrogenated an equimolecular mixture of aniline and phenol in the presence of a nickel catalyst by heating the mixture at 175° C. under a hydrogen pressure of from 125 to 200 atmospheres for 410 minutes and obtained a 98 per cent complete reduction with formation of cyclohexanol, dicyclohexylamine and cyclohexylamine in yields of 24 per cent, 33 per cent, and 35 per cent of theoretical, respectively.

It is an object of this invention to provide a method whereby mixtures of aniline and phenol may concurrently be hydrogenated and condensed to obtain dicyclohexylamine in improved yields.

We have found that the hydrogenation of mixtures of aniline and phenol occurs readily at moderately elevated temperatures and pressures in the presence of palladium-containing catalysts and that, when employing such catalyst, the reactants or their reduction products undergo concurrent chemical condensation at a fairly rapid rate to form dicyclohexylamine in exceptionally high yield. We have further observed that palladium is not a satisfactorily effective catalyst for the hydrogenation of aniline alone, but have found that the presence of only a minor amount of phenol in admixture with aniline, e. g. one molecular equivalent or more of phenol per nine mols of aniline, is sufficient to facilitate reduction and condensation of both reacting materials to form dicyclohexylamine in good yield. We have also found that when the starting mixture contains more than one molecular equivalent of phenol per mol of aniline, dicyclohexylamine is produced in good yield, based on the combined weight of the aniline and its molecular equivalent of the phenol, but that the excess phenol usually undergoes reduction with formation of cyclohexanol as a by-product.

From the facts just set forth, it is evident that the hydrogenation of mixtures of aniline and phenol in the presence of palladium permits formation of dicyclohexylamine in either or both of the ways represented by the following equations:

(1) 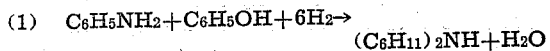

(2) 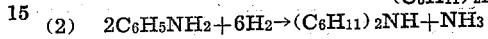

The first of these reactions predominates when phenol is present in amount approximating, or exceeding, the molecular equivalent of the aniline. However, the second reaction also occurs quite readily and predominates when the starting mixture contains a large molecular excess of aniline over phenol. Since both reactions lead to formation of dicyclohexylamine, the yield is high, regardless of which predominates.

In producing dicyclohexylamine in accordance with the invention, a mixture of aniline, phenol and a palladium-containing catalyst is heated to a reaction temperature in contact with hydrogen under pressure. Liquid diluents, such as cyclohexane, methylcyclohexane, benzene, toluene, or liquid paraffinic hydrocarbons, etc., may be present, but are not required.

Any hydrogenation catalyst containing finely divided palladium as the principal catalytic ingredient may be employed. Palladium deposited on charcoal is particularly active, but colloidal palladium, alone or deposited on other carrier materials such as calcium sulphate, calcium carbonate, barium sulphate, or infusorial earth, etc., can be used. The minimum proportion of catalyst varies somewhat depending on the activity of the catalyst and the vigor of stirring, or other agitation, during the reaction. In tests using palladium catalysts of sub-normal activity, we have observed that the reaction rates increased with increase in the vigor of agitation. This is thought to have been due to better distribution of the catalyst in the mixture. The catalyst is usually employed in amount such that its palladium content corresponds to from 0.05 to 0.5 per cent of the combined weight of the aniline and phenol. In some instances the catalyst may be used in lesser amount or it may be used in as large a proportion as desired.

The starting mixture usually contains aniline and phenol in a molecular ratio of from 1/2 to 5/1, and preferably contains approximately equimolecular proportions of the reactants, but either reactant may be in large excess over the other. For instance, the mixture may contain from one to nine mols or more of aniline per mol of phenol, or the phenol may be in as great a molecular excess over the aniline as desired. However, the presence of both aniline and phenol is required for a smooth reaction to obtain the dicyclohexylamine in good yield.

A mixture of aniline, phenol and a palladium catalyst in the proportions just given is treated with hydrogen under pressure and heated, preferably with agitation, to a reaction temperature. The minimum temperature and pressure satisfactory for use vary somewhat depending upon the proportion and activity of the palladium catalyst employed and the relative proportions of the aniline and phenol reactants, said reaction occurring most readily when phenol is present in amount as great as the molecular equivalent of the aniline. Also, with increase in the pressure of hydrogen on the system, the temperature may be lowered. The reaction is carried out in a closed vessel, e. g. a bomb or autoclave, preferably at temperatures between 140° and 175° C. under a hydrogne pressure of from 200 to 500 pounds per square inch, gauge. It may be conducted at lower or higher temperatures and pressures. For instance, temperatures of from 100° to 200° C. may be employed with good results and even lower or higher temperatures can be used. The hydrogen pressure may range from 120 pounds per square inch to pressures as great as desired, e. g. 5000 pounds per square inch or higher.

Heating with agitation of the mixture is advantageously continued until 75 per cent or more of the hydrogen theoretically required for a quantitative yield of dicyclohexylamine has been consumed and preferably until the consumption of hydrogen ceases or becomes sluggish. The extent of the reaction may be followed by observing the decrease in pressure as the reaction progresses. The reaction is usually complete after from 3 to 10 hours of heating, but longer heating may sometimes be required.

Unconsumed hydrogen is then vented from the reaction vessel and the charge removed. The reaction mixture is distilled to separate the dicyclohexylamine product. By the method as herein described, dicyclohexylamine may be produced in readily purifiable form and in yields of 75 per cent of theoretical or higher, based on the nitrogen content of the aniline and phenol starting mixture.

The following examples describe certain ways in which the invention has been practiced, but are not to be construed as limiting its scope.

*Example 1*

An autoclave containing 186.2 grams (2 mols) of aniline, 188.2 grams (2 mols) of phenol, and 7.5 grams of a catalyst consisting of activated carbon having 5 per cent by weight of finely divided palladium deposited thereon, was connected with a cylinder of hydrogen under pressure. Hydrogen was fed into the autoclave under a pressure of 200 pounds per square inch gauge while heating the reaction mixture at 175°–180° C. and agitating it by rocking the autoclave. The introduction of hydrogen under the conditions just stated was continued for 8 hours, i. e. until the consumption of hydrogen had substantially ceased. The autoclave was then cooled, hydrogen was vented therefrom, and the charge was removed and filtered to remove the catalyst. The reaction liquor was fractionally distilled, whereby a principal fraction of substantially pure dicyclohexylamine was collected in amount corresponding to 85 per cent of the weight of the mixture subjected to the distillation. The fractions preceding and following said principal fraction contained further, but unmeasured, amounts of dicyclohexylamine.

EXAMPLE 2

In each of a series of reactions, a mixture of 186 grams (2 mols) of aniline, 188 grams (2 mols) of phenol, and 14.9 grams of a palladium on carbon catalyst, similar to that employed in Example 1, was charged into an autoclave and the latter was evacuated to remove most of the air. The mixture was then heated to the reaction temperature indicated in the following table. Hydrogen, from a hydrogen cylinder, was fed to the reaction mixture under a pressure of 200 pounds per square inch, gauge, while maintaining the mixture at said reaction temperature and agitating the mixture by rocking the autoclave. During the reaction, hydrogen was fed to the reaction as necessary to maintain a constant pressure of 200 pounds per square inch. The extent of the reaction was followed by observing the decrease in pressure of the hydrogen in the cylinder used to supply the same. For purpose of comparing the relative rates of reaction in the several experiments, the amount of hydrogen consumed two hours after the start of each reaction was calculated. In the table, this amount is expressed as per cent of the hydrogen consumption theoretically required for complete reduction of the nuclei of the aniline and phenol starting materials. The reaction was continued until hydrogen ceased to be absorbed by the mixture, at which time the amount of hydrogen that had been fed from the cylinder exceeded slightly, but corresponded approximately to, that theoretically required for complete reduction of the aromatic nuclei of the aniline and phenol starting materials. The autoclave was then cooled, hydrogen vented therefrom, and the charge removed and filtered. A sample of each reaction liquor was fractionally distilled to separate the products. In each experiment, dicyclohexylamine was the principal product and no phenyl cyclohexylamine was obtained. As low boiling materials there were obtained a trace of unreacted phenol, water, and other products presumed to be cyclohexanol and cyclohexylamine. Table I gives the temperature at which each reaction was carried out, the per cent of complete hydrogenation two hours after the start of the reaction, and the per cent by weight of dicyclohexylamine in the reacted material subjected to the fractional distillation.

*Table I*

| Run No. | Reaction Temp., °C. | Per Cent Hydrogenation in 1st 2 hrs. | Per Cent Dicyclohexylamine in products |
|---|---|---|---|
| 1 | 130 | 62 | 83.3 |
| 2 | 140 | 70 | 85.3 |
| 3 | 150 | 74 | 77.4 |
| 4 | 160 | 76 | 74.2 |
| 5 | 170 | 69 | 82.5 |
| 6 | 180 | 67 | 84.3 |

It will be noted that the reaction rate, at the pressure employed, was highest at 160° C. The decrease in reaction rate with further increase in the temperature is believed to have been due to vaporization of one or more components of the reaction mixture, e. g. water formed in the reaction, with resultant decrease in the partial pressure of hydrogen on the liquid reaction mixture. From the above data, and results obtained in other experiments that have been carried out, it appears that at temperatures between 100° and 200° C. changes in the reaction temperature have little effect on the yield of dicyclohexylamine.

EXAMPLE 3

Two reactions were carried out as in Example 2, except that each reaction was conducted at a temperature of 160° C. and the applied pressure of hydrogen on the reacting mixture was 125 pounds per square inch, gauge, in one of the experiments and 200 pounds per square inch in the other. The time required for substantially complete reduction of the aniline and phenol was approximately 3 hours in the experiment carried out at a pressure of 200 pounds per square inch and approximately 6.5 hours in the experiment using a pressure of 125 pounds per square inch. A change in pressure does not appear to have any pronounced effect on the yield of dicyclohexylamine, provided the hydrogenation is carried substantially to completion.

EXAMPLE 4

This example illustrates the effect of varying the relative proportions of aniline and phenol in mixtures employed for the production of dicyclohexylamine in accordance with the invention. In each of a series of experiments, a mixture of aniline and phenol in the relative proportions given in Table II, was treated with 4 per cent of its weight of a palladium on carbon catalyst (containing 5 per cent by weight of palladium). The mixture was heated with agitation in an autoclave to a temperature of 200° C. and hydrogen was fed to the mixture as necessary to maintain a pressure of 200 pounds per square inch. The reactions employing two molecular equivalents or less of aniline per mol of phenol were continued until the consumption of hydrogen had ceased and sufficient hydrogen for complete reduction of the aniline and phenol had been consumed. However, the rate of hydrogenation becomes lower with increase in the proportion of aniline in the mixture. To conserve time, the experiments employing more than two mols of aniline per mol of phenol were stopped short of completion and the amounts of dicyclohexylamine and N-phenyl cyclohexylamine in the products were measured. Since N-phenyl cyclohexylamine hydrogenates to dicyclohexylamine, the yield of dicyclohexylamine obtainable by complete hydrogenation may be calculated with fair accuracy from the combined amount of N-phenyl cyclohexylamine and dicyclohexylamine obtained, provided well over half, e. g. three-fourths or more, of the amount of hydrogen required for a complete reduction has been consumed. If a lesser amount of hydrogen is consumed, the yields thus calculated are low. After terminating each reaction, the products were separated as in the preceding examples. Table II gives the molecular ratio of aniline to phenol in each starting mixture and the per cent completion of the hydrogenation reaction. In instances in which the amount of hydrogen fed during a reaction corresponded to, or exceeded slightly, that theoretically required for complete hydrogenation, the extent of hydrogenation is given as 100 per cent. The table gives the per cent by weight of dicyclohexylamine and of N-phenyl cyclohexylamine in each reacted mixture. It also gives the per cent yields of dicyclohexylamine obtained in the reactions which were carried to completion and the yields of dicyclohexylamine calculated as obtainable by continued reaction for those experiments which were stopped short of complete hydrogenation. The yields are based on the amount of dicyclohexylamine theoretically obtainable from the aniline and phenol starting materials. In the table, aniline, phenol, N-phenyl cyclohexylamine and dicyclohexylamine are abbreviated as "An," "Ph," "PCHA," and "DCHA," respectively.

*Table II*

| Run No. | Mol Ratio, An/Ph | Per Cent Hydrogenation | Reacted Mixture Contains— | | Per Cent Yield |
|---|---|---|---|---|---|
| | | | PCHA, Per Cent | DCHA, Per Cent | |
| 1 | 0.5/1 | 100 | None | 62.0 | 92.4 |
| 2 | 1/1 | 100 | None | 82.1 | 82.1 |
| 3 | 2/1 | nearly 100 | 3.9 | 66.5 | 1 70.5 |
| 4 | 5/1 | 80 | 23.0 | 37.7 | 1 61.4 |
| 5 | 9/1 | 54 | 31.4 | 13.0 | 1 45.5 |

1 Calculated as obtainable by a complete reaction.

Other modes of applying the principle of the invention may be employed instead of those explained, change being made as regards the method herein disclosed, provided the step or steps stated by any of the following claims, or the equivalent of such stated step or steps be employed.

We therefore particularly point out and distinctly claim as our invention:

1. A method for the production of dicyclohexylamine which comprises reacting together hydrogen, aniline and phenol by heating a mixture of 9 molecular equivalents of aniline and at least one molecular equivalent of phenol together with palladium as a catalyst at temperatures between 100° and 200° C. in contact with hydrogen at a pressure of at least 120 pounds per square inch.

2. A method, as described in claim 1, wherein the reaction is carried out in contact with hydrogen at a pressure of at least 200 pounds per square inch.

3. A method, as described in claim 1, wherein approximately equimolecular proportions of aniline and phenol are employed in the reaction.

4. A method, as described in claim, 1, wherein the catalyst consists of finely divided palladium on carbon as a carrier material and approximately equimolecular amounts of aniline and phenol are subjected to the reaction.

5. A method of making dicyclohexylamine which comprises reacting together in the presence of a palladium on carbon catalyst, hydrogen, aniline and phenol, the aniline and phenol being in approximately equimolecular proportions and the reaction being carried out at temperatures between 140° and 175° C. under a hydrogen pressure of at least 200 pounds per square inch gauge and being continued at least until the consumption of hydrogen becomes sluggish, thereafter venting unreacted hydrogen from the mixture and separating the dicyclohexylamine product by fractional distillation.

LESTER J. DANKERT.
DANIEL A. PERMODA.

REFERENCES CITED

The following references are of record in the file of this patent:

UNITED STATES PATENTS

| Number | Name | Date |
|---|---|---|
| 1,982,985 | Ernst et al. | Dec. 4, 1934 |

FOREIGN PATENTS

| Number | Country | Date |
|---|---|---|
| 280,801 | Italy | Dec. 20, 1930 |
| 544,291 | Germany | Dec. 18, 1932 |

OTHER REFERENCES

Skita et al., Ber. Deut. Chem., vol. 52, pp. 1519–1535 (1919).

Guyot et al., Bull. Soc. Chim., vol. 47, pp. 203–210 (1930).

Diwoky et al., J. Am. Chem. Soc., vol 53, pp. 1863–1875 (1931).

Carswell et al., Ind. Eng. Chem., vol. 29, pp. 1247–1251 (1937).

Baker et al., J. Am. Chem. Soc., vol. 69, pp. 1250–1252 (1947).